United States Patent
Parmigiani et al.

(10) Patent No.: US 6,374,022 B1
(45) Date of Patent: Apr. 16, 2002

(54) BEND LIMITING DEVICE FOR CABLES

(75) Inventors: Bruno Parmigiani, Milan; Angelo Sala, Merate, both of (IT)

(73) Assignee: Pirelli Cavi e Sistemi S.p.A., Milan (IT)

( * ) Notice: Subject to any disclaimer, the term of this patent is extended or adjusted under 35 U.S.C. 154(b) by 0 days.

(21) Appl. No.: 09/468,921

(22) Filed: Dec. 22, 1999

Related U.S. Application Data (60) Provisional application No. 60/115,592, filed on Jan. 12, 1999.

(30) Foreign Application Priority Data

Dec. 23, 1998 (EP) .............................. 98124572

(51) Int. Cl.[7] ................................. G02B 6/44
(52) U.S. Cl. ................. 385/100; 385/136; 385/147; 174/135
(58) Field of Search ............... 385/100, 136, 385/147; 174/74 R, 74 A, 75 F, 81, 135, 136; 138/110; 285/114, 115, 116

(56) References Cited

U.S. PATENT DOCUMENTS

| 4,367,967 A | 1/1983 | Albert, Jr. |
|---|---|---|
| 4,396,797 A | 8/1983 | Sakuragi et al. |
| 4,739,801 A | 4/1988 | Kimura et al. |
| 5,204,931 A | * 4/1993 | Gehringer ............... 385/146 |
| 5,461,690 A | 10/1995 | Lampert |

FOREIGN PATENT DOCUMENTS

| DE | 30 15 948 | 10/1981 |
|---|---|---|
| EP | 0 226 188 | 6/1987 |
| EP | 0 711 007 | 5/1996 |
| GB | 2 142 788 | 1/1985 |
| GB | 2 289 577 | 11/1995 |

* cited by examiner

Primary Examiner—Darren Schuberg
Assistant Examiner—Leo Boutsikaris
(74) Attorney, Agent, or Firm—Finnegan, Henderson, Farabow, Garrett, & Dunner, L.L.P.

(57) ABSTRACT

A device for limiting the bending of a cable includes a body made of polymeric material for housing a portion of the cable connected to a joining element and includes at least two rigid elements incorporated in the body and defining spacing elements in the radial direction for the portion of cable, these rigid elements having a substantially annular shape and different diameters and being mechanically independent of one another.

16 Claims, 4 Drawing Sheets

BEND LIMITING DEVICE FOR CABLES

This application is based on European Patent Application No. 98124572.3 filed on Dec. 23, 1998 and U.S. Provisional Application No. 60/115,592 filed on Jan. 12, 1999 the content of which is incorporated hereinto by reference.

The present invention relates to a bend limiting device for cables and in particular to a bend limiting device for submarine cables. Both in the case of an electric cable and in the case of an optical cable, the greatest risks of damage due to bending exist along discontinuous portions of the cable itself, in particular in the region of rigid joining elements. In fact, in the case of bending of the cable, and in particular in the case of bending during traction, since the cable has a relatively poor flexural strength, the curvature of the cable portion leaving the joining element may have a very small radius, which may be such as to result in damage or breakage of the cable itself. Basically, each type of cable has its own limit value for the radius of curvature, below which the functional capacity of the cable itself is adversely affected.

In order to reduce the risks of breakage of a cable in the region of the joining elements, bend limiting devices are generally used. These usually comprise a flexible elongated body to be applied on the outside of the cable in the region of the joining element and able to provide a predefined flexural strength, ensuring that the curvature assumed by the cable itself does not reach critical values. For example, the patent U.S. Pat. No. 5,461,690, in the name of AT&T IPM Corp., proposes an apparatus for limiting the bending of a cable to be used in the region of a connector. The apparatus has an elongated cylindrical shape and is composed of elastic material able to withstand loads within predefined limits. On its external surface, the apparatus has circumferential grooves which delimit one or more weakened portions which are designed to bend under the action of relatively small loads. This apparatus is suitable for cables with small dimensions, for example cables with a single optical fibre, and the loads which can be withstood by the apparatus itself are those which may occur during use of cables of this type.

In some applications, however, the loads to be withstood are very high, for example several tonnes. Loads of this order of magnitude occur for example during the process of laying of submarine cables. Submarine cables are electric or optical cables used for conveying energy or for long-distance telecommunications and designed to be laid on sea or ocean beds. The diameter of these cables may vary between about 14 mm and 50 mm in the case of optical cables and between about 50 mm and 160 mm in the case of energy supply cables.

Submarine cables generally comprise sections of cables of limited length which are joined by rigid joining elements. In the case of telecommunications cables, the lengths of the sections may reach maximum values of a hundred or so kilometers and the joining elements may house signal repeaters.

Laying of submarine cables is performed by means of special cable-laying ships which are provided with cable guiding members, usually pulleys with a suitable diameter (of about 3 m for the laying of optical cables and about 6 m for the laying of energy supply cables) so as to allow laying of the cable in water without damaging it. The cable, during laying, must withstand a tractional force which may reach (depending on the weight of the cable itself and the laying depth) several tens of tonnes (for optical cables, the tractional force may vary between 4 and 35 tonnes, depending on the type of cable). When the joining element passes over the guiding member, a situation arises where the joining element contacts the guiding member only in the region of a central portion thereof, while its ends remain at a distance from the above mentioned surface which depends on the curvature of the surface itself and the dimensions of the joining element. Consequently, the cable portion leaving the joining element is not supported by the guiding member surface and, being subjected to a high tractional force directed transversely with respect to the joining element, is subject to severe bending. If the curvature of the cable at the maximum bending point exceeds a critical value, the cable may be damaged. For example, in the case of an optical fibre cable, breakage of the covering sheath of the cable or damage of the optical fibres may occur.

The submarine cable may be, for example, an optical cable of the SA (Single Armour) type. A typical structure of an SA cable comprises a core containing the optical fibres and several coaxial reinforcing and insulating layers, including a load-bearing steel layer (in order to provide the cable with tensile strength), a copper sheath, an insulating layer of polyethylene and an external steel-wire armouring for mechanical protection. The cable may have, for example, an external diameter of 35.9 mm and a weight of 3 kg/m in the air and 2.5 kg/m in the water.

A submarine cable, with a joining element incorporated, in order to be able to be considered suitable for use, must successfully pass bending tests on pulleys as laid down by international standards. The tests include the passage of the cable provided of the joining element over a pulley of 3 m diameter, in accordance with the following criteria (which simulate the severest conditions which could occur during laying):

a) fifty passages under a normal load, i.e. a NOTS (Nominal Operating Tensile Stress) load which in the case of an SA cable is equal to 180 kN;

b) three passages under a load equal to 90% of the breaking load, i.e. a NTTS (Nominal Transient Tensile Stress) load which in the case of an optical cable of the SA type is equal to 260 kN.

In order to ensure that the cable can withstand these stresses, it may be necessary to apply, to the cable portion connected to the joining element, a device which performs the function of a bend limiting device.

In order to protect submarine cables, or in any case cables which are subject to very high loads, from risks of excessive bending in the region of the joints, numerous types of bend limiting devices have been proposed.

The patent application GB 2142788A, in the name of British Telecommunications, describes a bend limiting device comprising a plurality of annular segments which are adjacent and joined together and which define a cylindrical cavity housing the cable portion connected to the joining element. The annular segments are joined together with play by means of bolts and are movable angularly with respect to one another so as to provide the structure with flexibility. The bend limiting device proposed has a limit radius of curvature which depends on the form and the dimensions of the annular segments and the bolts. This bend limiting device has the drawbacks that it is relatively bulky, heavy and complicated to assemble. Moreover, after a certain period of time spent in sea water, corrosion phenomena may result in permanent seizing of the bend limiting device, thereby rendering it useless in the case of recovery of the cable. A similar operating principle is adopted for the bend limiting device according to the patent EP 226188 in the name of Società Cavi Pirelli S.p.A.

The patent U.S. Pat. No. 4,367,967, in the name of Preformed Line Marine Inc., describes a device for relieving the bending forces acting on a cable, comprising a plurality of sleeve elements which are rigid and coaxial with each other and connected together by means of elastomeric material. The adjacent sleeve elements have co-operating surfaces which interfere with one another so as to limit the curvature of the device. More in detail, each sleeve element comprises two longitudinal portions with different diameters. The smaller-diameter portion of each element extends with play inside the larger-diameter portion of the adjacent element. Flexing of the device is made possible, within predefined limits, by the abovementioned play between overlapping portions until the portions themselves interfere with each other. Such a device is described in the patent U.S. Pat. No. 4,396,797 in the name of Horiba Ltd, in which sleeve elements of the type similar to that described above are separated axially from one another by means of flexible rings. Also in the case of the bend limiters according to the U.S. Pat. No. 4,367,967 and U.S. Pat. No. 4,396,797, the high functional interdependence of the sleeve elements, in view of the high stresses transmitted by the cable during bending, may give rise to problems of permanent seizing of the structure.

Further types of bend limiting devices are proposed by the patent application GB 2289577, in the name of Northern Telecom Limited, and the patent U.S. Pat. No. 4,739,801, in the name of Tysubakimoto Chain Co., which both describe bend limiters of the modular type. In particular, the patent application GB 2289577 describes a bend limiter comprising a plurality of adjacent segments in which each segment terminates in a spherical or semi-spherical portion designed to engage in an adjacent segment. The patent U.S. Pat. No. 4,739,801 describes a bend limiter comprising a plurality of segments terminating on both sides in semi-spherical portions and joined together by means of further segments having spherical cavities which are designed to receive the semi-spherical portions.

The abovementioned bend limiting devices suitable for use with high loads are semi-rigid structures which are designed to allow bending of the cable up to a predefined limit whereupon, once reached, they lock together owing to mechanical interference between adjacent rigid elements, thus preventing excessive bending. When the cable passes over a guiding member, the action of these bend limiting devices is independent of the supporting action of the guiding member itself.

With the present invention, the Applicants propose a device which, in the case of submarine cables or, more generally, in the case of cables which must pass over a rigid guiding member of the pulley type (or other similar type), is able to achieve a reduction in bending of the cable in the region of the joining element itself, by exploiting, differently from that which occurs in the known techniques, the supporting action provided by the guiding member itself. The present invention proposes, in particular, exploiting the supporting action of the guiding member by means of a bend limiting device which performs mainly the function of a spacer between the cable and the guiding member, thus allowing the cable to transmit onto the surface of the guiding member itself the tensions applied onto it and progressively move towards this surface, preventing the occurrence of excessive local bending.

The device according to the present invention is designed to be applied to the cable in the region of a rigid joining element and comprises a plurality of rigid elements housed in a flexible body made of polymeric material. Unlike that which occurs in the limiting devices of the known type, these rigid elements are operationally independent of one another. For the purposes of the present invention, the term "rigid elements" is understood as referring to elements which have a compressive strength and a flexural strength such as not to undergo significant deformations when the device is subjected to loads of the order of magnitude of those normally acting on the cables considered here. Moreover, for the purposes of the present invention, the expression "mechanically independent elements" is understood as meaning elements which are devoid of mechanical connections and formed so as to avoid, under any operating conditions of the device, interference between their parts.

In the device according to the present invention, the rigid elements are annular elements which perform, independently of one another, the function of spacers between the cable and the surface of the guiding member and are kept in position by the polymeric material of the flexible body.

The particular form of the rigid elements and the characteristics of the polymeric material provide the device according to the invention with a flexural strength such as to allow the device itself to perform its function of bend limiter device also in the absence of an external supporting surface, provided that the loads acting on the cable are not particularly high (for example during cable handling operations prior to laying for storage and maintenance of the joining element). The Applicants have moreover found that the presence of through-holes in the inserts allows the strength of the polymeric body to be increased in the region of the inserts, preventing in particular separation between the polymeric material and the inserts themselves occurring when the device is subject to flexural and/or tractional stresses.

The device proposed is designed with dimensions depending on various parameters, including the type and dimensions of the cable, the dimensions of the guiding member, the dimensions of the joining element, the value of the tractional force to which the cable must be subjected and the maximum value of curvature to which the cable may be subjected.

The bend limiting device according to the present invention is simple and economical to manufacture, has small dimensions and is relatively lightweight. Moreover, this device, being devoid of mechanically co-operating rigid parts, is free from risks of permanent seizure.

According to a first aspect thereof, the present invention relates to a system for the transmission of signals or energy, comprising a cable for the transmission of signals or energy, at least one joining element for joining different portions of said cable, and a bend limiting device applied to said cable in the region of said joining element; said device comprising a flexible tubular body housing a portion of said cable, and at least two rigid elements housed in said body and defining spacing elements in the radial direction for said cable portion, said rigid elements having different external diameters and being arranged in a decreasing order of diameter away from said joining element, said system being characterized in that said rigid elements are mechanically independent of one another.

According to a further aspect thereof, the present invention relates to a device for limiting the bending of a cable, comprising a body made of polymeric material and designed to house a portion of said cable connected to a joining element and comprising moreover at least two rigid elements housed in said body and defining spacing elements in the radial direction for said cable portion, said device being characterized by the fact that said rigid elements are mechanically independent of one another.

In particular, said rigid elements have a substantially annular shape and different diameters and are arranged in decreasing order of diameter away from said joining element. Moreover, said body has a tubular shape and incorporates said rigid elements.

Preferably, said rigid elements have through-holes housing said polymeric material. Moreover, each of said rigid elements has an axis and comprises a radially internal portion and a radially external portion, said radially internal portion having axial dimensions which are greater than said radially external portion. In particular, said radially internal portion has axial dimensions ranging between a first value equal to the diameter of said cable and a second value equal to twice the diameter of said cable.

Preferably, said radially internal portion defines a sleeve portion and said radially external portion defines a substantially annular flange portion. Said sleeve portion has preferably a radially internal surface defining a support surface for said cable, said support surface comprising a central surface portion with a minimum diameter and end surface portions with a diameter increasing from said central surface portion.

Preferably, said body houses a rigid connection element for connection to said joining element, said connection element having through-holes housing said polymeric material.

Preferably, said polymeric material is an elastomeric material, more preferably a polyurethane rubber, an ethylene-propylene copolymer or a silicone rubber.

Preferably, said rigid elements are made of metallic material. Alternatively, said rigid elements are made of thermoplastic material or thermosetting material.

So that the present invention may be better understood, a preferred embodiment is now described, purely by way of a non-limiting example, with reference to the accompanying drawings, in which.

Figure 1:
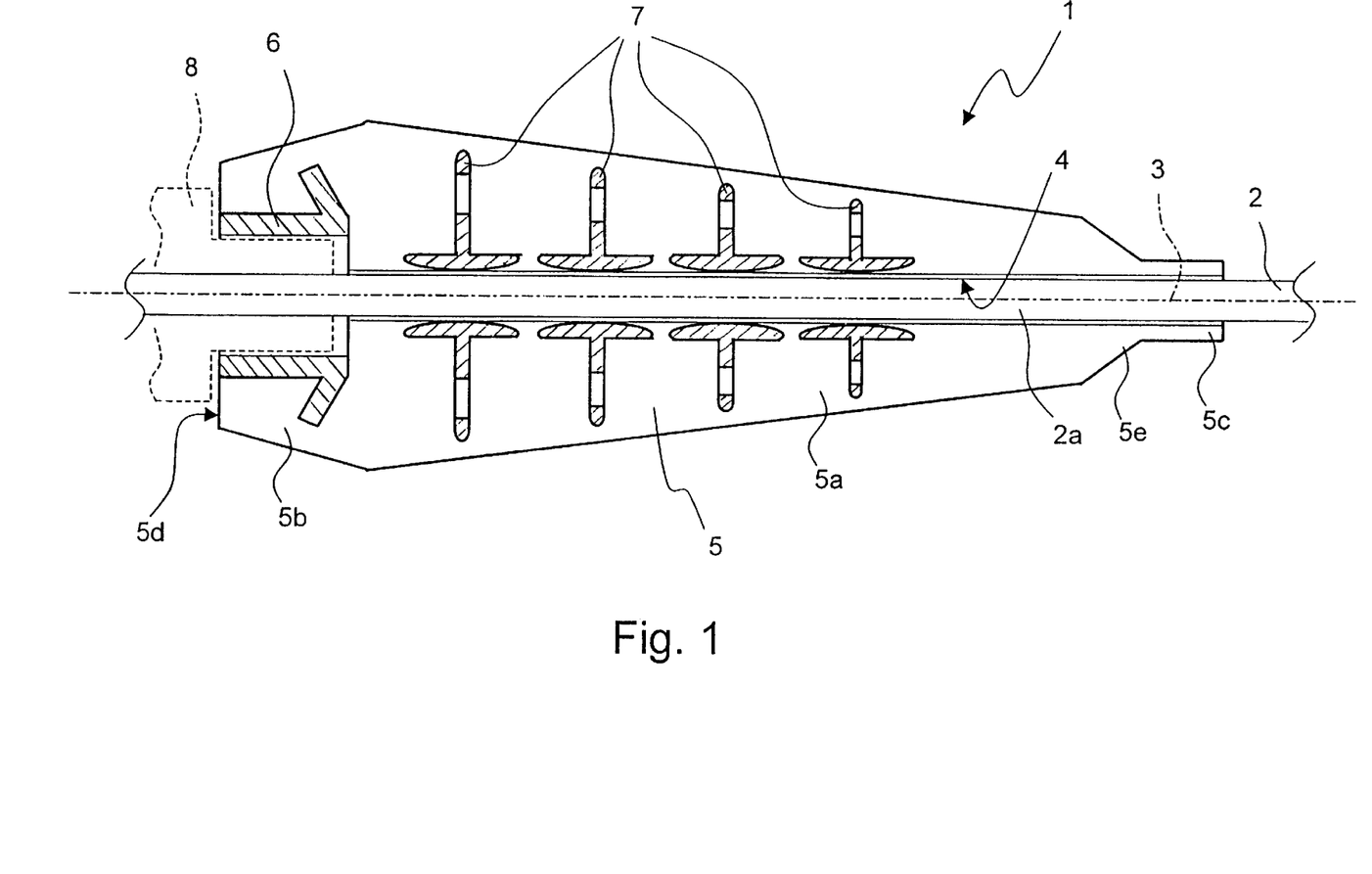
FIG. 1 is a longitudinal section through the bend limiting device according to the invention shown in an undeformed rest configuration thereof.

With reference to FIG. 1, 1 denotes in its entirety a bend limiting device—shown in an undeformed configuration thereof—which is designed to be applied on the outside of a cable 2 in the region of a cable portion 2a having a discontinuity, for example in the region of a cable portion 2a connected to a joining element 8 (shown only partly and in broken lines). The cable 2 may be, for example, an optical submarine cable of the type described above. The cable 2, the joining element 8 and the device 1 define part of a system for the transmission of signals or energy.

The device 1 has the shape of an elongated tubular body having, in its undeformed configuration, an axis of symmetry 3. It defines internally a cylindrical hole 4 coaxial with the axis 3 for housing the cable portion 2a. The device 1 comprises a flexible body 5 made of polymeric material, a ring element 6 for connection to the joining element 8 and a plurality of annular inserts 7 incorporated inside the body 5.

The body 5 defines a supporting and retaining structure for the cable portion 2a, for the ring element 6 and for the inserts 7. The body 5 is made of polymeric material which is chosen so as to provide the body 5 itself with predefined elastic properties. Preferably this material is a polyurethane rubber or another elastomeric material, such as a composition based on ethylene propylene (EPR) or a silicone rubber. An additive for protection against ultraviolet rays may be added to the material.

By way of example, Table 1 below shows the main characteristics of polyurethane rubber and EPR.

TABLE 1

|  | Polyurethane rubber | EPR |
| --- | --- | --- |
| Breaking load (N/mm$^2$) | 5–16 | 5–12 |
| Ultimate elongation (%) | 400–1000 | 200–600 |
| Hardness (Shore A) | 50–80 | 50–80 |

The body 5 has a main central portion 5a, a first end portion 5b and a second end portion 5c, the first two having a frustoconical shape and being adjacent to one another and the third one having a substantially cylindrical shape and being joined to the central portion 5a by means of a further frustoconical portion 5e.

The first end portion 5b houses the ring element 6 and is delimited by a flat annular surface 5d which is arranged on a plane perpendicular to the axis 3 and is located facing (after installation of the device 1 on the cable portion 2a) the joining element 8. The external diameter of first end portion 5b progressively increases from the surface 5d.

The central portion 5a incorporates the inserts 7 and has an external diameter which substantially decreases away from the first end portion 5b towards the second end portion 5c. If necessary, the central portion 5a may comprise longitudinal sub-portions with external surfaces which are differently inclined.

The second end portion 5c has a substantially constant external diameter which is slightly greater than that of the cable 2.

The dimensions of the body 5 and, in particular, of the central portion 5a and the end portions 5b, 5c, must be chosen on the basis of design parameters such as the diameter of the guiding member over which the cable 2 must pass, the dimensions of the joining element 8, the diameter of the cable 2, the tractional force to which the cable must be subjected (which depends, in the case of submarine cables, on the weight of the cable 2 and the laying depth) and the maximum permissible curvature for the cable 2 itself.

The ring element 6 is made of corrosion-resistant metallic material with mechanical characteristics which are similar to those of the material of the joining element 8. For example, the ring element 6 may be made of ARMCO 17-4-PH (state 1150) steel and have a hardness of 28/37 HRC. With reference to the configuration shown in FIG. 1, the ring element 6 is arranged coaxial with the axis 3 and its longitudinal dimensions are preferably less than those of the first end portion 5b.

Figure 2:
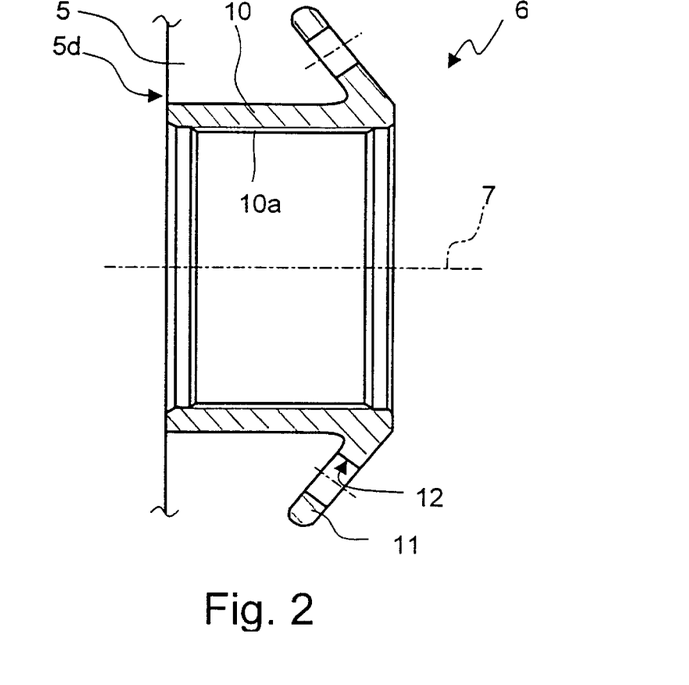
FIG. 2 is an enlarged view of an element forming part of the device according to FIG. 1.
Figure 3:
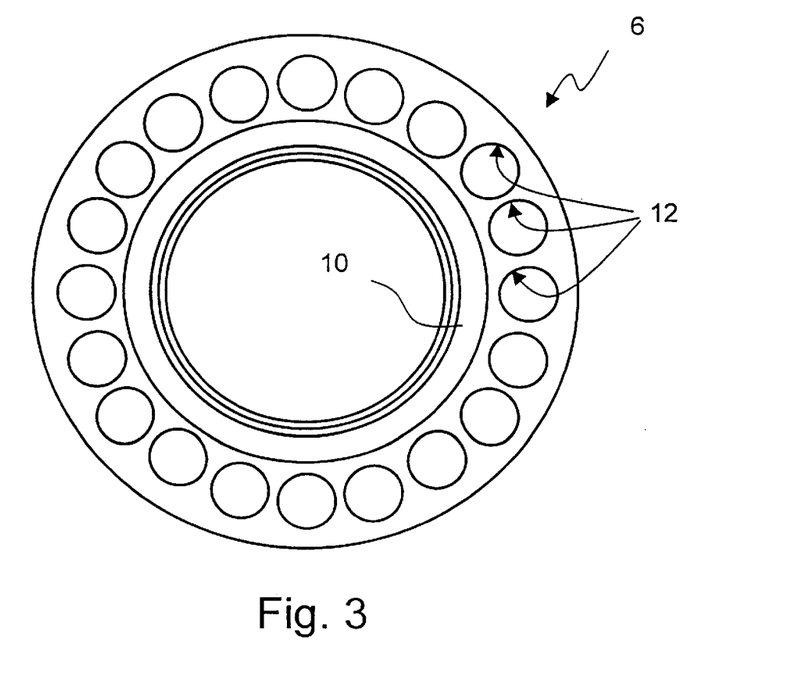
FIG. 3 is a plan view of the element according to FIG. 2.

With reference to FIGS. 2 and 3, the ring element 6 comprises a sleeve portion 10 and an annular flange portion 11. The sleeve portion 10 has internally a thread 10a extending over practically the whole of the length of the sleeve portion 10 itself, so as to allow joining to a corresponding threaded sleeve portion (not shown) of the joining element 8. The flange portion 11, which is made as one piece at one end of the sleeve portion 10 opposite to the surface 5d, has the function of "anchoring" the ring element 6 to the body 5. The flange portion 11 is inclined towards the surface 5d and defines a predefined angle (for example 30°) with a plane perpendicular to the axis 3. Moreover, the flange portion 11 has a plurality of through-holes 12 arranged in a ring and substantially equidistant. The holes 12 house polymeric material so as to ensure continuity of material between the two opposite surfaces of the flange portion 11. In this way, the useful area of material which is able to withstand tractional and flexural forces is increased in the region of the flange portion 11 itself.

At the interface between the ring element 6 and the polymeric material of the body 5 there may be present a thin layer of adhesive material (primer) for preventing separation of the polymeric material from the surface of the ring element 6 itself when the device 1 is tractionally stressed. In the case of a submarine cable, these risks of separation occur, for example, when the cable passes over a device with motor-driven wheels, intended to move the cable itself towards the guiding member at a speed equal to the laying speed. In fact, when the device 1 passes through the device with motor-driven wheels, it is subject to a sudden axial stress which tends to cause separation of the polymeric material from the ring element 6. The presence of the adhesive material and the holes 12 (housing polymeric material) helps prevent said separation from occurring.

The inserts 7 have the function of providing the device 1 with rigidity in the radial direction. In particular, if the cable 2 has to pass over a surface which is not flat (such as the surface of a guiding member), the inserts 7 operate in the manner of spacers between the cable portion 2a and the abovementioned surface, obliging the cable portion 2a itself to pass along a path with a curvature within the permitted limits. Moreover, the inserts 7 allow the body 5 to retain a substantially cylindrical shape even when subject to flexing, thus avoiding phenomena of ovalisation of its cross section which would cause a sudden reduction in the radius of curvature of the cable 2.

The inserts 7 are made of a material which is designed to withstand compressive forces (in the radial direction) up to a predefined limit. This limit depends mainly on the tractional force to which the cable 2 must be subjected and on the radius of curvature of the guiding member over which the cable 2 must pass. If this limit is high, the inserts 7 are preferably made of metallic material, of a type which is resistant to corrosion, for example austenitic steel. If, on the other hand, this limit is not high, the inserts 7 may be made of a thermoplastic material (such as nylon, for example) or a thermosetting material.

Again with reference to the configuration according to FIG. 1, the inserts 7 are arranged so as to be coaxial with the axis 3 and preferably equidistant. The inserts 7 have different external diameters and are positioned in decreasing order of diameter away from the first end portion 5b towards the second end portion 5c. The number and the dimensions of the inserts 7 are chosen mainly on the basis of the dimensions of the joining element 8, the diameter of the cable 2, the tractional force to which the cable 2 itself must be subjected and the curvature of the external surface of the guiding member.

Figure 4:
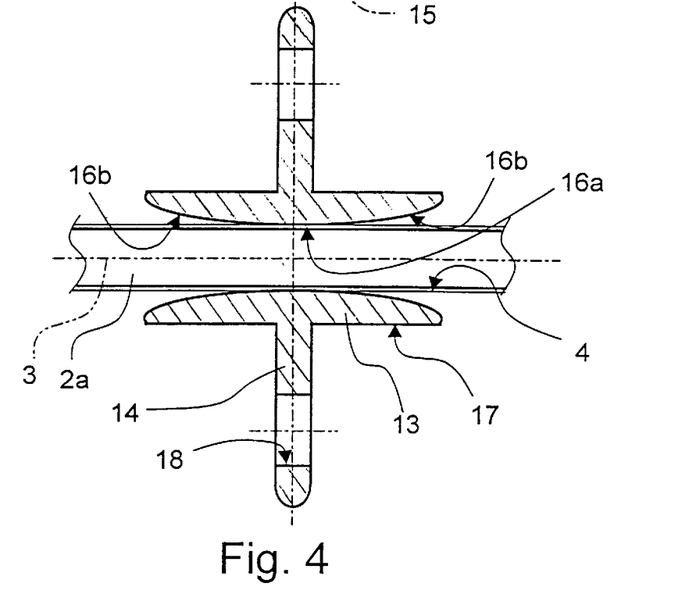
FIG. 4 is an enlarged view of a further element of the device according to FIG. 1.
Figure 5:
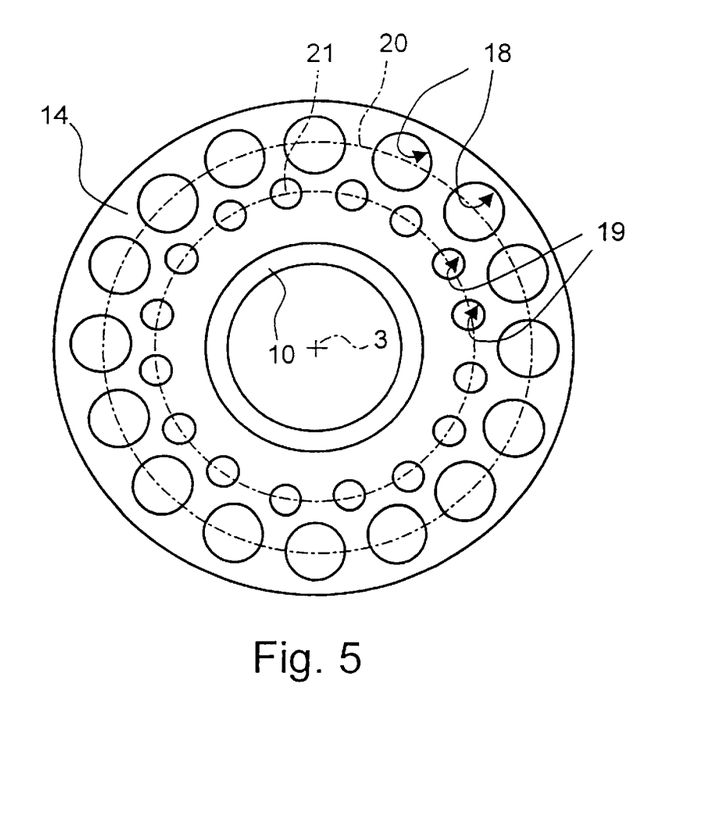
FIG. 5 is a plan view of the element according to FIG. 4.

With reference to FIGS. 4 and 5, each insert 7 is symmetrical with respect to a plane which is perpendicular to the axis 3 and the intersection of which with the plane of FIG. 4 is indicated by 15, and has a sleeve portion 13 and a substantially radial flange portion 14. The sleeve portion 13 has a radially internal surface 16 for supporting the cable 2, which is defined by a central surface portion 16a, which is substantially cylindrical and has a diameter substantially equal to the diameter of the hole 4, and by two rounded side surface portions 16b, extending with continuity from the portion 16a and with a diameter gradually increasing from the portion 16a itself. This shape of the surface 16 is chosen so as to avoid the presence of superficial edges which, in the case of flexing of the device 1, could damage the cable portion 2. The sleeve portion 13 also has a radially external surface 17 with a substantially constant diameter.

The axial dimension of the sleeve portion 13 is chosen so as to ensure good stability of the insert 7 and prevent the insert 7 itself from being able to incline in an undesirable manner, with the risk of damaging locally the cable portion 2, when the device 1 passes over a guiding member. The axial dimension of the sleeve portion 13 may be the same for all the inserts 7 and is preferably chosen in a range lying between the value of the diameter of the cable 2 and twice this value.

The flange portion 14 extends in cantilever fashion in a radial direction from the external surface 17 of the sleeve portion 13 and has a first and a second plurality of through-holes 18, 19. The holes 18, 19 house polymeric material so as to ensure continuity of material between the opposite surfaces of the flange portion 14. In this way, in the section of the body 5 defined by the plane 15, the useful area of material able to withstand the flexural and tractional forces is increased. If these holes were not present, since the polymeric material adheres poorly to the surfaces of the flange 14, all the forces would in effect be borne by the thin portion of polymeric material arranged externally, in the radial direction, with respect to the flange portion 14. In the case of high stresses, this thin portion of polymeric material would tend to tear.

With reference to the plane of FIG. 5, the centres of the holes 18, 19 are arranged on a first circumference 20 with its centre on the axis 3 and, respectively, on a second circumference 21 concentric with and inside the first one. Preferably, the holes 19 are equal in number to the holes 18, have a diameter which is smaller than that of the holes 18 and are arranged angularly offset with respect to the holes 18 so as to optimise the compressive strength of the insert 7. The number, the size and the arrangement of the holes may be different from those indicated, depending on requirements. In particular, these parameters must be chosen so as to achieve a compromise between the radial compressive strength of the insert 7 and the tractional and flexural strength of the polymeric material in the region of the insert 7 itself.

The axial thickness of the flange portion 14 is chosen according to the type of material used for the inserts 7 and according to the tractional forces to which the cable 2 must be subjected, so as to avoid flexing with respect to the plane 15.

The shape and the distance from one another of the inserts 7 are chosen so as to avoid mechanical interference between the inserts 7 themselves when the body 5 is deformed. In fact, when the body 5 is deformed as a result of flexing, the inserts 7 undergo a relative rotation and their distance from one another varies. For example, when passing over a pulley, the body 5 flexes so as to follow the curvature of the surface of the pulley itself and the inserts 7 tend to rotate with respect to one another so as to arrange the respective flange portions 14 perpendicular to the surface of the pulley itself. The inserts 7 define in this way spacers arranged between the surface of the pulley and the cable 2 and define a path of limited curvature for the cable portion 2a. The shape of the inserts 7 is such that both the sleeve portions 13 and the flange portions 14 are devoid of interference in all the expected operating conditions of the device 1.

Possible dimensions of the device 1 are given below, purely by way of example, the Applicants having considered them to be preferred dimensions in the case of a cable 2 with an external diameter of 50 mm, connected to a joining element with a length of 460 mm and an external diameter of 180 mm, and suitable for passing over a guiding member with a diameter of 3 m and withstanding, during laying at sea, a tractional force of about 35 tonnes. A minimum permissible radius of curvature for the cable 2 of 700 mm has also been assumed.

In order to be able to operate effectively in the conditions described above, the device I may be provided with the following dimensions:

total length: 670 mm maximum diameter (at the joint between the central portion 5a and the first end portion 5b): 240 mm length of the second end portion 5c: 40 mm diameter of the second end portion 5c: 70 mm diameter of the hole 4: variable from a maximum of 58 mm at the first end portion 5b to a minimum of 54 mm at the second end portion inclination of the central portion 5a with respect to the axis 3: variable from a minimum of 0° to a maximum of 15° inclination of the first end portion 5b: 20° inclination of the connecting portion: 30° number of inserts: 4 external diameters of the inserts: 195 mm, 210 mm, 220 mm and 230 mm, respectively length of the sleeve portion 13: 76 mm diameter of the circumferences 20 and 21: 160 mm and 100 mm, respectively diameter of the holes 18 and 19: 32 mm and 15 mm, respectively number of holes 18 and 19 for each insert 7: 12.

Figure 6:
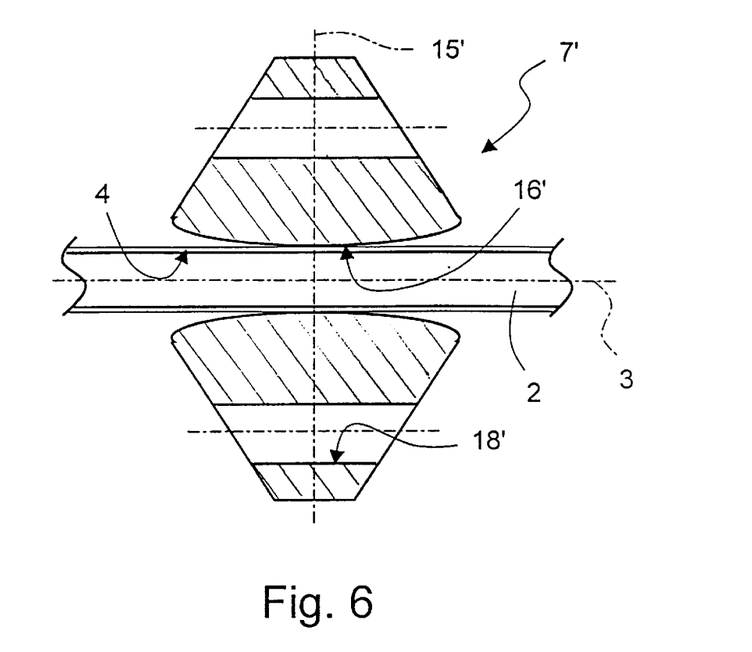
FIG. 6 shows a possible variation of the element according to FIG. 4.

FIG. 6 shows an insert 7' which can be used together with other inserts of the same shape, in place of the inserts 7. The insert 7' may be made of metallic material, thermoplastic material or thermosetting material. The insert 7' may be symmetrical with respect to a plane which is perpendicular to the axis 3 and the intersection of which with the plane of the figure is indicated by 15' and has an axial dimension gradually decreasing radially outwards so as to avoid mutual interference with the adjacent inserts 7' when the bend limiting device undergoes a bending. The insert 7' has a radially internal surface 16' which is substantially the same as the surface 16 of the insert 7, with a minimum diameter substantially equal to the diameter of the hole 4. In a similar manner to the insert 7, the insert 7' has longitudinal through-holes 18' housing polymeric material. As already mentioned above, the presence of these regions of longitudinal continuity of the polymeric material is important for ensuring that the body 5 has a good local tractional and flexural strength. The arrangement, the number and the shape of the holes 18' are chosen according to requirements.

With respect to the inserts 7, the inserts 7' are more bulkier but, depending on the characteristics of the material used, they are able to withstand, without undergoing bending with respect to the plane 15', greater radial compressive stresses. Moreover, the particular shape of the inserts 7' provides the bend limiting device with a greater rigidity since a smaller quantity of polymeric material is present between the inserts 7' than in the case of the inserts 7. The dimensions, the distance between each other and the material of the inserts 7' are chosen with the same criteria used for the inserts 7.

Figure 7:
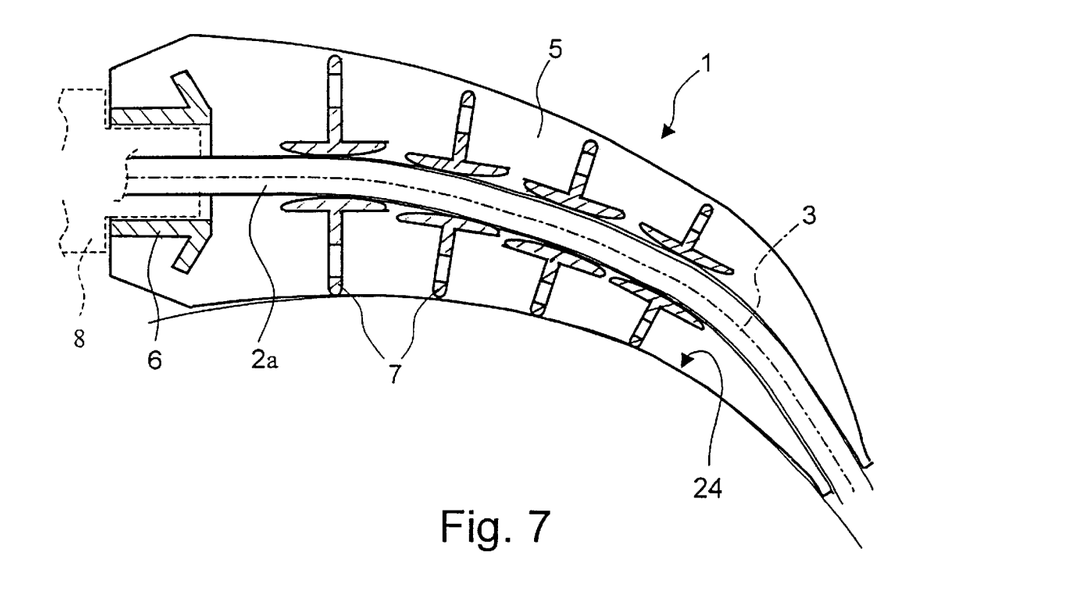
FIG. 7 is shows the device according to FIG. 1 in an operationally deform d configuration.

Operation of the device 1 is illustrated in FIG. 7, with reference to the case of a cable 2 designed to pass under tractional conditions over a curved surface 24, for example the external surface of a pulley-type guiding member. As the joining element 8 passes over the surface 24, the device 1 undergoes bending and adheres with its external surface to the surface 24 itself. The inserts 7 are oriented so as to be substantially perpendicular to the surface 24 and define supports of gradually decreasing height for the portion 2a on the surface 24 itself. The inserts 7 define, in particular, with their own sleeve portions 13, a path for the portion 2a having a curvature which is slightly greater than that of the surface 24 so as to move the portion 2a towards the surface 24 gradually. During bending of the device 1, the inserts 7 are devoid of areas of mutual interference and the bending of the device 1 is limited owing to the supporting action of the surface 24.

The device 1 is made with a moulding process which allows the body 5 consisting of polymeric material to be formed around the ring element 6 and the inserts 7 (or 7'). This moulding process is simple and economical if polymeric materials suitable for insertion into a casting mould are used, while it is more complex if other materials with a higher viscosity, such as for example an EPR composition, are used.

The device 1 is manufactured using a mould (not shown) comprising a spindle, designed to support the inserts 7 and the ring element 6, and a casing which can be opened and which houses the spindle and has an internal surface with the same shape as the external surface of the body 5.

The spindle is oriented vertically and has an external diameter such as to be able to support with play the inserts 7. Moreover, the spindle has at the top a free end and at the bottom an annular flange which is threaded externally and is designed to receive and support the ring element 6. Moreover, in order to facilitate the operations (described below) of positioning of the inserts 7 prior to the moulding stage and the operations of extraction of the device 1 at the end of the moulding stage, the diameter of the spindle has, in the upwards direction, reductions in diameter of about 1 mm in predefined axial positions. These axial positions delimit a corresponding number of longitudinal portions of the spindle which are each designed to support a respective insert 7.

Prior to positioning of the inserts 7, the ring element 6 is positioned, being screwed onto the threaded flange of the spindle. The inserts 7 are then positioned one at a time, in decreasing order of diameter. Each insert 7 is positioned by arranging it on the free top end of the spindle and by then displacing it downwards until it is arranged along the portion intended for it. The inserts 7 are spaced out by means of tubular spacers, each of which has an external diameter approximately equal to the external diameter of the sleeve portion 13 and is designed to support a respective insert on the preceding insert at a predefined distance from the latter. A further tubular spacing element, which is positioned on the ring element 6 prior to positioning of the first insert (i.e. the insert with a larger diameter), is designed to support the first insert itself on the ring element 6 itself at a predefined distance from the latter.

The spacing elements are made of polymeric material and preferably of the same material from which the body 5 must be made.

Once the stage of positioning of the inserts 7 has been completed, the casing of the mould is closed and the polymeric material is cast inside the mould, from above. During this casting stage, the tubular elements located between the inserts 7 remain inside the mould and the material which forms them helps forming the body 5. The cast material undergoes crosslinking which produces an increase in temperature. This crosslinking phenomenon may be speeded up by heating the walls of the mould so as to provide heat to the cast material.

At the end of the moulding process, the casing of the mould is opened and the device 1 is moved angularly with respect to the axis of the spindle so as to disengage it from the annular flange of the spindle. After being disengaged from the annular flange, the device 1 is extracted from the spindle.

In the case where EPDM is used, the moulding process is preferably performed in two stages so as to ensure correct positioning of the inserts 7 inside the final structure.

Finally, it is obvious that the control device may be subject to modifications and variations without departing from the protective scope of the present invention.

What is claimed is:

1. System for the transmission of signals or energy, comprising a cable for the transmission of signals or energy, at least one joining element for joining different portions of said cable, and a bend limiting device applied to said cable in the region of said joining element; said device comprising a flexible tubular body housing a portion of said cable, and at least two rigid elements housed in said body and defining spacing elements in the radial direction for said cable portion, said rigid elements having different external diameters and being arranged in a decreasing order of diameter away from said joining element, said system being characterized in that said rigid elements are mechanically independent of one another.

2. Device for limiting the bending of a cable, comprising a body made of polymeric material and designed to house a portion of said cable connected a joining element and comprising moreover at least two rigid elements housed in said body and defining spacing elements in the radial direction for said cable portion, said device being characterized by the fact that said rigid elements are mechanically independent of one another wherein said rigid elements have a substantially annular shape and different diameters and are arranged in decreasing order of diameter away from said joining element.

3. Device according to claim 2, wherein said body has a tubular shape and incorporates said rigid elements.

4. Device according to claim 2, wherein said rigid elements have through-holes housing said polymeric material.

5. Device according to claim 2, wherein each of said rigid elements has an axis and comprises a radially internal portion and a radially external portion, said radially internal portion having axial dimensions which are greater than said radially external portion.

6. Device according to claim 5, wherein said radially internal portion has axial dimensions ranging between a first value equal to the diameter of said cable and a second value equal to twice the diameter of said cable.

7. Device according to claim 5, wherein said radially internal portion defines a sleeve portion and said radially external portion defines a substantially annular flange portion.

8. Device according to claim 7, wherein said sleeve portion has a radially internal surface defining a support surface for said cable, said support surface comprising a central surface portion with a minimum diameter and end surface portions with a diameter increasing from said central surface portion.

9. Device according to claim 2, wherein said body houses a rigid connection element for connection to said joining element, said connection element having through-holes housing said polymeric material.

10. Device according to claim 2, wherein said polymeric material is an elastomeric material.

11. Device according to claim 10, wherein said elastomeric material is a polyurethane rubber.

12. Device according to claim 10, wherein said elastomeric material is an ethylene-propylene copolymer.

13. Device according to claim 10, wherein said elastomeric material is a silicone rubber.

14. Device according to claim 2, wherein said rigid elements are made of metallic material.

15. Device according to claim 2, wherein said rigid elements are made of thermoplastic material.

16. Device according to claim 2, wherein said rigid elements are made of thermosetting material.

* * * * *

UNITED STATES PATENT AND TRADEMARK OFFICE
CERTIFICATE OF CORRECTION

PATENT NO. : 6,374,022 B1
DATED : April 16, 2002
INVENTOR(S) : Bruno Parmigiani et al.

It is certified that error appears in the above-identified patent and that said Letters Patent is hereby corrected as shown below:

Column 11,
Line 33, "connected a" should read -- connected to a --.

Signed and Sealed this

Ninth Day of July, 2002

Attest:

Attesting Officer

JAMES E. ROGAN
Director of the United States Patent and Trademark Office